US010921600B2

(12) United States Patent
Baudou et al.

(10) Patent No.: US 10,921,600 B2
(45) Date of Patent: Feb. 16, 2021

(54) AIRCRAFT HEAD-MOUNTED VISUALIZATION SYSTEM WITH HASPS COMPATIBLE WITH AUDIO HEADPHONES

(71) Applicant: THALES, Courbevoie (FR)

(72) Inventors: Joël Baudou, Saint Medard en Jalles (FR); Guy Meyer, Saint Medard en Jalles (FR)

(73) Assignee: THALES, Courbevoie (FR)

( * ) Notice: Subject to any disclaimer, the term of this patent is extended or adjusted under 35 U.S.C. 154(b) by 224 days.

(21) Appl. No.: 16/089,291

(22) PCT Filed: Mar. 24, 2017

(86) PCT No.: PCT/EP2017/057099
§ 371 (c)(1),
(2) Date: Sep. 27, 2018

(87) PCT Pub. No.: WO2017/167665
PCT Pub. Date: Oct. 5, 2017

(65) Prior Publication Data
US 2020/0301152 A1 Sep. 24, 2020

(30) Foreign Application Priority Data
Apr. 1, 2016 (FR) ...................................... 1600550

(51) Int. Cl.
*G09G 5/00* (2006.01)
*G02B 27/01* (2006.01)
(52) U.S. Cl.
CPC ................ *G02B 27/0176* (2013.01)

(58) Field of Classification Search
CPC .. G02B 27/01; G02B 27/017; G02B 27/0176; G02B 27/0181; A42B 3/30
See application file for complete search history.

(56) References Cited

U.S. PATENT DOCUMENTS 5,696,521 A * 12/1997 Robinson ............. G02B 27/017
345/8
6,369,952 B1 * 4/2002 Rallison ............... G02B 27/017
359/630

(Continued)

FOREIGN PATENT DOCUMENTS

| CN | 101067716 A | 11/2007 |
| CN | 201156127 Y | 11/2008 |

(Continued)

OTHER PUBLICATIONS

Chinese Notification of First Office Action issued in Chinese Patent Application No. 2017800216760 dated Jun. 28, 2020.

*Primary Examiner* — Joe H Cheng
(74) *Attorney, Agent, or Firm* — BakerHostetler

(57) ABSTRACT

Visualization systems are provided which are intended to be worn by the head of a user wearing an audio headset consisting of a first hoop and two lateral earpieces, the visualization system comprising at least one headband in the form of a strap and a visualization device mounted on the headband. The headband comprises two symmetrical lateral hasps, each hasp being in the form of an arch so as to form an opening of a few centimeters between the arch and the head of the user so that, when the system is worn by the head, the opening is sufficient to allow the passage of one of the two lateral arms of the first hoop.

8 Claims, 4 Drawing Sheets

(56) References Cited

U.S. PATENT DOCUMENTS

| | | | |
|---|---|---|---|
| 6,496,161 B1 | 12/2002 | Tanaka | |
| 8,378,924 B2 * | 2/2013 | Jacobsen | G02B 27/0172 345/7 |
| 2002/0030649 A1 | 3/2002 | Zavracky et al. | |
| 2008/0080733 A1 * | 4/2008 | Mei | H04R 1/1066 381/379 |
| 2012/0287284 A1 * | 11/2012 | Jacobsen | G06F 3/012 348/158 |
| 2014/0176398 A1 * | 6/2014 | West | G02B 27/0176 345/8 |
| 2016/0187662 A1 * | 6/2016 | Sato | G02B 27/017 345/8 |
| 2016/0366502 A1 * | 12/2016 | Morris | H04R 1/1066 |
| 2017/0052378 A1 * | 2/2017 | Yang | G02B 27/0176 |
| 2017/0123451 A1 * | 5/2017 | Baudou | G06F 1/163 |

FOREIGN PATENT DOCUMENTS

| | | |
|---|---|---|
| EP | 1 202 566 A1 | 5/2002 |
| JP | 9-90268 A | 4/1997 |
| JP | H10-333078 A | 12/1998 |
| JP | 11-161188 A | 6/1999 |

\* cited by examiner

AIRCRAFT HEAD-MOUNTED VISUALIZATION SYSTEM WITH HASPS COMPATIBLE WITH AUDIO HEADPHONES

CROSS-REFERENCE TO RELATED APPLICATIONS

This application is a National Stage of International patent application PCT/EP2017/057099, filed on Mar. 24, 2017, which claims priority to foreign French patent application No. FR 1600550, filed on Apr. 1, 2016, the disclosures of which are incorporated by reference in their entirety.

FIELD OF THE INVENTION

The field of the invention is that of the visualization systems worn by the head of a user. These systems allow in particular the display of information superimposed on the outside landscape. Now, these are known in particular by the term "see-through HMD", "HMD" being the acronym for "head-mounted display". They can be monocular or binocular. They are used in various applications.

BACKGROUND

They are used in particular in the cockpits of civilian and military aircraft to present to the pilot essential information concerning piloting or navigation. In this type of application, they are associated with the audio communication means also worn by the head of the user. To present information in conformal position, that is to say in the exact position that this information occupies outside, it is necessary to know perfectly the orientation or the posture of the visualization system in space. So, the visualization device is also associated with a posture detection system.

The visualization devices worn by the head are generally mounted on a headset. The headset is intended for impact protection and supports the audio communication function comprising the two earpieces and the microphone. The protection and communication headset produces the interface with the head and serves also as support for the display device. These headset-mounted visualization devices are these days reserved for the military or paramilitary field.

The head-mounted visualization devices also offer a benefit for general or commercial civilian aviation applications. For these civilian applications, the wearing of a protective headset is neither essential nor desirable. Indeed, a headset presents an excessive bulk in a cockpit. Moreover, it gives a sensation of heat and of isolation. Finally, the view by the passengers of a headset-wearing pilot can pose image problems for the airlines.

The audio communication headset forms part of the equipment and of the visual codes of civil aviation pilots. The mounting of a compact and discrete display device that is compatible with the audio headset adds a "connected" image that is acceptable to the pilot and the passengers.

There are consumer, so-called "see-through" civilian augmented reality devices that are capable of displaying flight information. These devices are generally spectacles such as the "Google Glass" developed by the company Google. These very lightweight spectacles are generally not compatible with the wearing of sight spectacles, or audio communication headsets, or breathing masks used in aeronautics. Also, these systems do not have the performance levels required for aeronautical applications.

Head harnesses comprising adjustable or elastic fixings have also been produced that make it possible to fix optical systems such as miniature cameras developed by the company GoPro or surgical binocular magnifiers. These systems are not designed to be compatible with the wearing of audio headsets or to be used in an aeronautical environment.

There are also audio headset designs comprising a visualization device for consumer applications that the performance levels of the display or posture detection device are not applicable to an aeronautical use, particularly for reasons of accuracy of conformity of the images presented with the real landscape and of reliability and visibility of such information. Phonic insulation must also be ensured with a very high degree of effectiveness so as to protect the pilot from surrounding noises.

Finally, the company Elbit has developed a visualization system known by the brand name "Skylens™" housed in a ski mask type mask that attaches to the head with an elastic strap. This system cannot be mounted easily in the presence of an audio communication headset.

A display and posture detection device intended for aeronautical use has a weight of at least 200 g. It is therefore necessary to dispose it in front of the eye of the pilot so that the weight and the inertia of the visualization device does not result in forward slippage of the assembly leading to visual loss of information. A balancing of the moment induced by this weight is therefore necessary. This moment can be compensated by bearing on the nose or the face. The latter solutions are little or not at all compatible with the wearer of sight or sunglasses.

This moment can also be compensated by the addition of a balancing counterweight or bearing on the back of the head. To be effective, the counterweight or the bearing must be located at the base of the cranium level with the inion or the nape of the user. The nape-bearing solution is lighter and less fatiguing on long journeys than the counterweight. However, this system has to remain compatible with the wearing of audio communication headsets.

SUMMARY OF THE INVENTION

The head-mounted visualization system according to the invention does not present the above drawbacks. It comprises a headband comprising lateral hasps which make it possible to mount the system on the head of the user, even if the latter is wearing an audio headset. It thus makes it possible to ensure both a good fixing of the headset visualization device while being perfectly compatible with the wearing of a standard audio headset of aeronautical type.

More specifically, the subject of the invention is a visualization system intended to be worn by the head of a user wearing an audio headset consisting of a first hoop and two lateral earpieces, said visualization system comprising at least one headband in the form of a strap and a visualization device mounted on said headband, characterized in that said headband comprises two symmetrical lateral hasps, each hasp being in the form of an arch so as to form an opening of a few centimeters between said arch and the head of the user so that, when the system is worn by said head, said opening is sufficient to allow the passage of one of the two lateral arms of the first hoop.

Advantageously, the headband comprises a second head hoop that can be adjusted in length.

Advantageously, the headband comprises a nape brace that can be adjusted in length.

Advantageously, the visualization device comprises an optical module comprising a display, a collimation optic and a thin optical plate for superimposing images.

Advantageously, the visualization device comprises a posture detection assembly fixed on to the optical module.

Advantageously, the posture detection assembly is hybrid and comprises an optical recognition system and an inertial sensor.

Advantageously, the headband comprises means for translating and rotating the visualization device, said rotation means comprising an articulated pivot or ball joint.

Advantageously, the visualization device has a first position of use in which the optical plate is disposed in front of an eye of the user and a second, set-aside position, said second position being substantially perpendicular to the first position, the optical plate being disposed level with the forehead of the user in this second position.

BRIEF DESCRIPTION OF THE DRAWINGS

The invention will be better understood and other advantages will become apparent on reading the following description given in a nonlimiting manner and from the attached figures in which.

DETAILED DESCRIPTION

Figure 1:
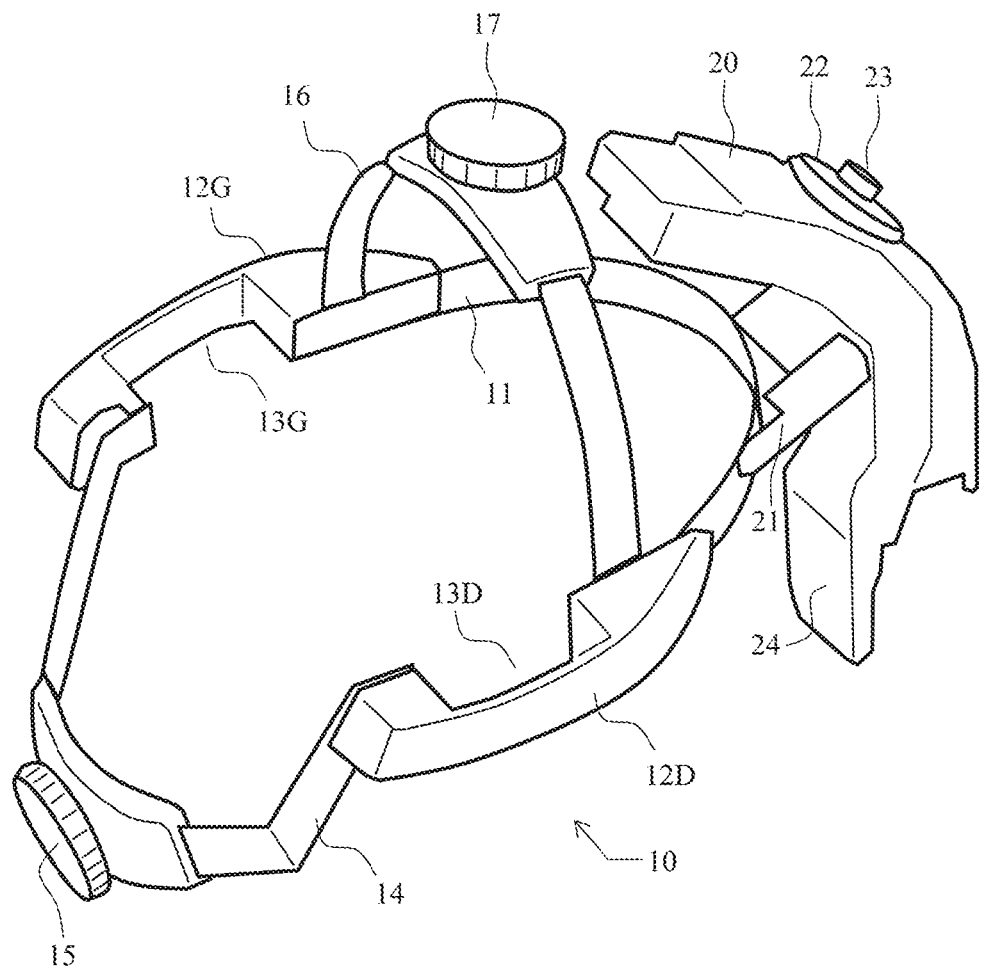
FIG. 1 represents a perspective view of a head-mounted visualization system according to the invention.

By way of nonlimiting example, FIG. 1 represents a perspective view of a head-mounted visualization system according to the invention. This visualization system essentially comprises two main parts which are a headband 10 in the form of a strap and a visualization device 20 mounted on said headband.

The headband comprises a front bearing 11, two identical lateral hasps 12D and 12G, a nape rest 14 and a head hoop 16.

The lateral hasps are in the form of an arch and each comprise an opening 13D or 13G situated level with the ears of a user. The width of this opening lies between one or two centimeters and its length is three to five centimeters so as to form a sufficient space between the head of the user and the headband. This space makes it possible to mount the visualization system on the head of a user wearing an audio headset without him or her having to remove his or her audio headset. The hasps have a smooth and rounded outer profile in order to avoid the risks of catching with external cables.

The nape rest 14 comprises two arms of a length that is adjustable by means of a thumbwheel 15. This adjustment can be done, for example, by means of a rack system or any other mechanical adjustment means. This adjustment is of a few centimeters, sufficient to adapt the headband to the morphological variations of the human head. Similarly, the hoop 16 also comprises two arms of a length that can be adjusted by means of a thumbwheel 17. Here too, this adjustment can be done by means of a rack system or any other mechanical adjustment means. This hoop is situated in front of the hasps so as to allow the passage of an audio headset. The settings are memorized either by a notched system, or by the adhesion and the friction of the arms in their runners.

Figure 2:
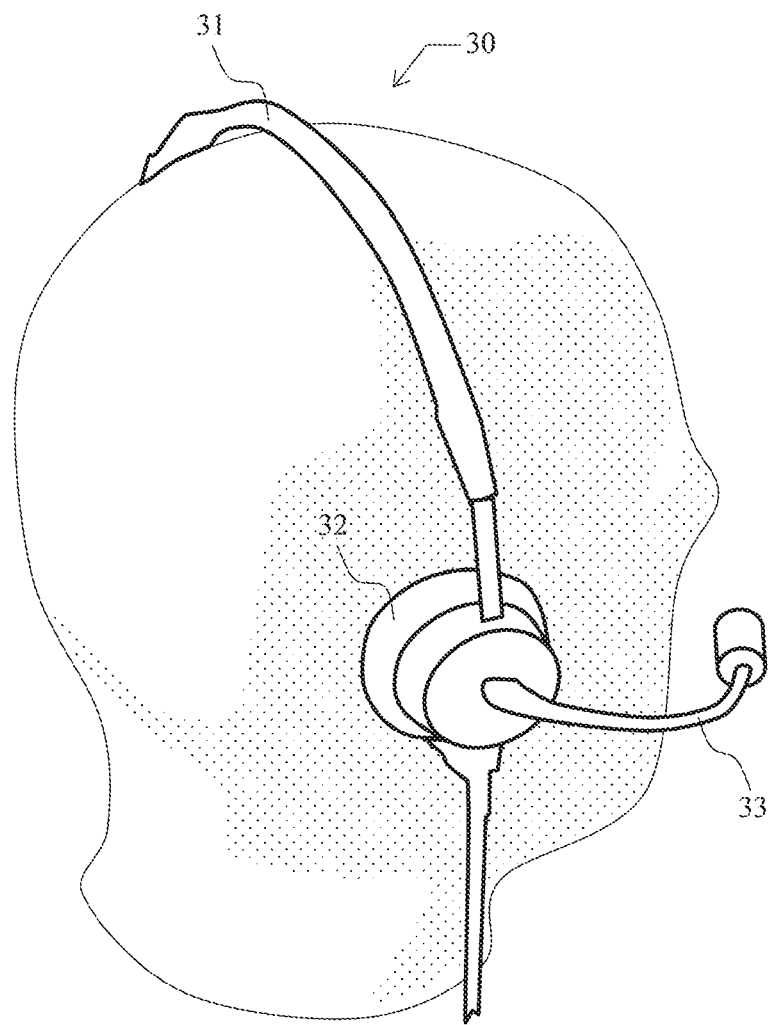
FIG. 2 represents an audio headset of aeronautical type.
Figure 3:
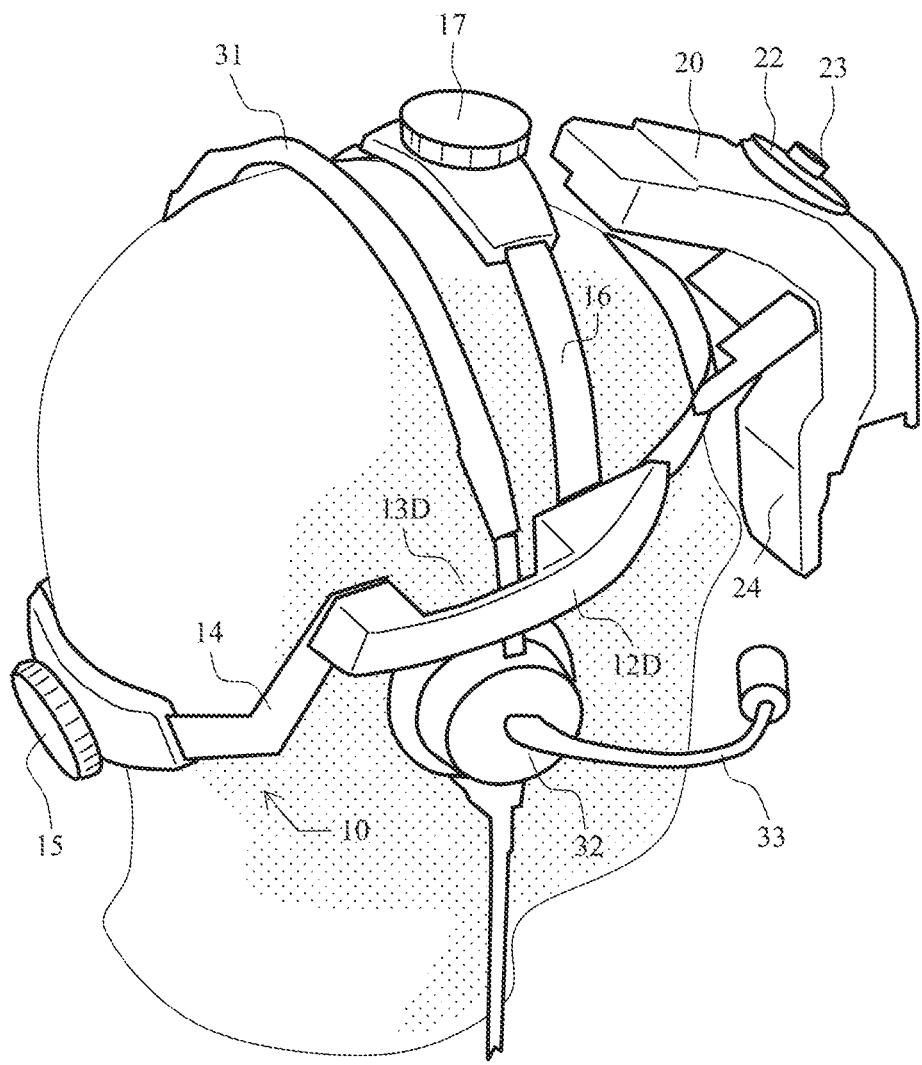
FIG. 3 represents a head-mounted visualization system according to the invention mounted over the audio headset of FIG. 2.

FIG. 2 represents an audio headset 30 of aeronautical type. It comprises a hoop 31, two audio earpieces 32 and a microphone 33. FIG. 3 represents the visualization system according to the invention of FIG. 1 mounted on the audio headset of FIG. 2. During the phases of placement or removal of the visualization system, the earpiece-bearing arms of the audio headset pass freely through the openings 13D and 13G of the hasps. The hoop 16 of the headband is disposed in front of the hoop 31 of the audio headset.

The visualization device 20 is mounted on the front bearing 11 of the headband. It comprises an optical module and a posture detection assembly. In the various figures, the optical module is monocular. The headband according to the invention is compatible with the wearing of binocular modules.

The optical module comprises a display, a collimation optic and a thin optical plate 24 for superimposing images. Generally, the display is a liquid crystal micromatrix with strong luminance. The collimation optic is a centered optic giving the imager an image to infinity. The optical plate is a thin plate comprising a plurality of inclined internal semi-reflecting plates ensuring both the transmission of the collimated image and its superimposition on the outside. The distance between the eye of the user and the optical plate is a few centimeters to allow for the wearing of sight glasses. Other optical solutions can be envisaged.

The posture detection assembly is secured to the optical module. It is situated in the front zone. This assembly makes it possible to perfectly locate the visualization system in a reference frame linked to the aircraft or in a terrestrial reference frame. It is thus possible to generate conformal images which are exactly superimposed on the outside landscape.

Preferentially, the posture detection assembly is hybrid and comprises an optical recognition system 22 and an inertial sensor 23 as represented in FIG. 1. The optical recognition system incorporates a camera associated with shape recognition software and a distance and position computation algorithm. The inertial sensor allows for a compensation of the distance and position computation time by motion prediction. The accuracy of the system is ensured by the optical recognition system and the refresh rate by the inertial sensor.

The front bearing comprises mechanical translation and rotation adjustments making it possible to perfectly position the visualization device in front of the eye of the observer. Markers present in the image that make it possible to perfectly position the visualization device in front of the eye of the user so that he or she can see all of the optical field given by the optical module.

The vertical translation of the visualization device is produced by the tensioning of the head hoop 16 by means of the thumbwheel 17, the lateral translation is produced by a small rotation of the headband about the head.

Figure 4:
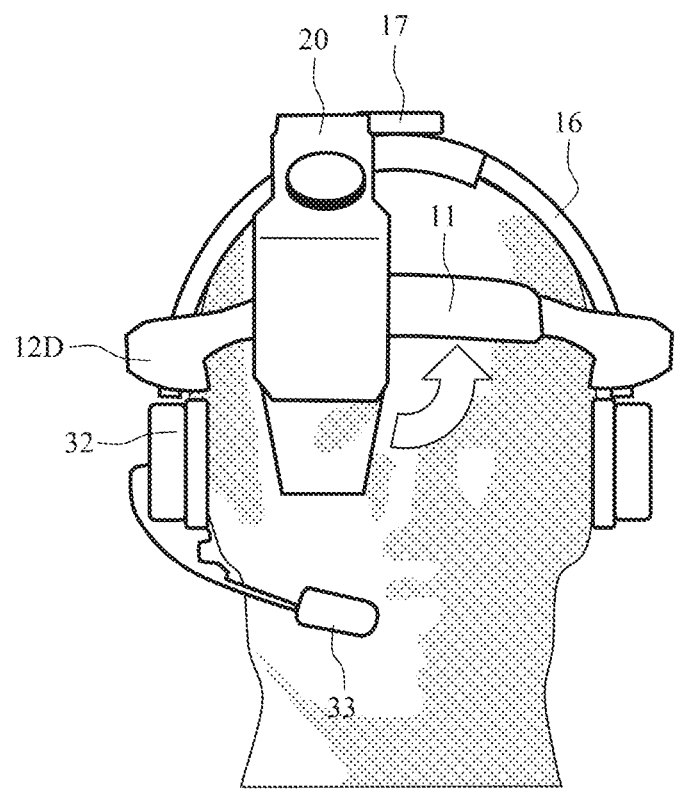
FIG. 4 represents a front view of a head-mounted visualization system according to the invention in position of use.
Figure 5:
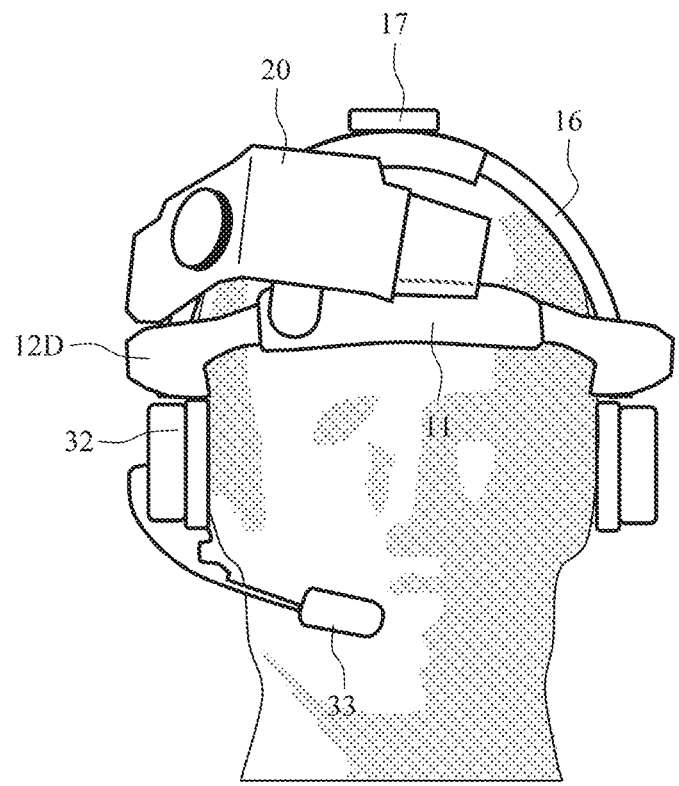
FIG. 5 represents a front view of a head-mounted visualization system according to the invention in set-aside position.

As can be seen in FIGS. 4 and 5, the visualization device can be mounted on an articulated pivot or ball joint 21 so as to have two positions: a first position of use illustrated in FIG. 4, in which the optical plate is disposed in front of the eye of the user and a second, set-aside position illustrated by FIG. 5, said second position being substantially perpendicular to the first position, the optical plate being disposed level with the forehead of the user in this second position.

The ball joint link between the headband and the display device has a first vertical axis of rotation which makes it possible to compensate the angle of rotation of the headband in order to keep the center of the field of the visualization device in the axis of the head and a second substantially horizontal axis of rotation which makes it possible to pivot the visualization device out of the visual field in set-aside position.

The ball joint link also makes it possible to easily pivot the visualization device without interfering with the nose. For just the setting-aside function, a horizontal pivot is sufficient.

The power cable for the optical and posture detection module run through the articulated ball joint and along the headband and exit in front of the ear so as not to interfere with the audio headset power cord. These cables are not represented in the various figures.

The invention claimed is:

1. A visualization system intended to be worn by the head of a user wearing an audio headset consisting of a first hoop and two lateral earpieces, said visualization system comprising at least one headband in the form of a strap and a visualization device mounted on said headband, wherein said headband comprises two symmetrical lateral hasps, each hasp being in the form of an arch so as to provide an opening of a few centimeters between said arch and the head of the user so that, when the visualization system is worn by said head of the user, said opening is sufficient to allow the passage of each one of the two lateral arms of the first hoop.

2. The visualization system as claimed in claim 1, wherein the headband comprises a second head hoop that can be adjusted in length.

3. The visualization system as claimed in claim 1, wherein the headband comprises a nape brace that can be adjusted in length.

4. The visualization system as claimed in claim 1, wherein the visualization device comprises an optical module comprising a display, a collimation optic and a thin optical plate for superimposing images.

5. The visualization system as claimed in claim 4, wherein the visualization device comprises a posture detection assembly fixed on to the optical module.

6. The visualization system as claimed in claim 5, wherein the posture detection assembly is hybrid and comprises an optical recognition system and an inertial sensor.

7. The visualization system as claimed in claim 1, wherein the headband comprises means for translating and rotating the visualization device, said rotation means comprising an articulated pivot or ball joint.

8. The visualization system as claimed in claim 7, wherein the visualization device has a first position of use in which a thin optical plate is disposed in front of an eye of the user and a second, set-aside position, said second position being substantially perpendicular to the first position, the optical plate being disposed level with the forehead of the user in this second position.

* * * * *